2 Sheets--Sheet 1.
J. W. KELLBERG.
Delivering Apparatus for Printing-Presses.
No. 167,841. Patented Sept. 21, 1875.
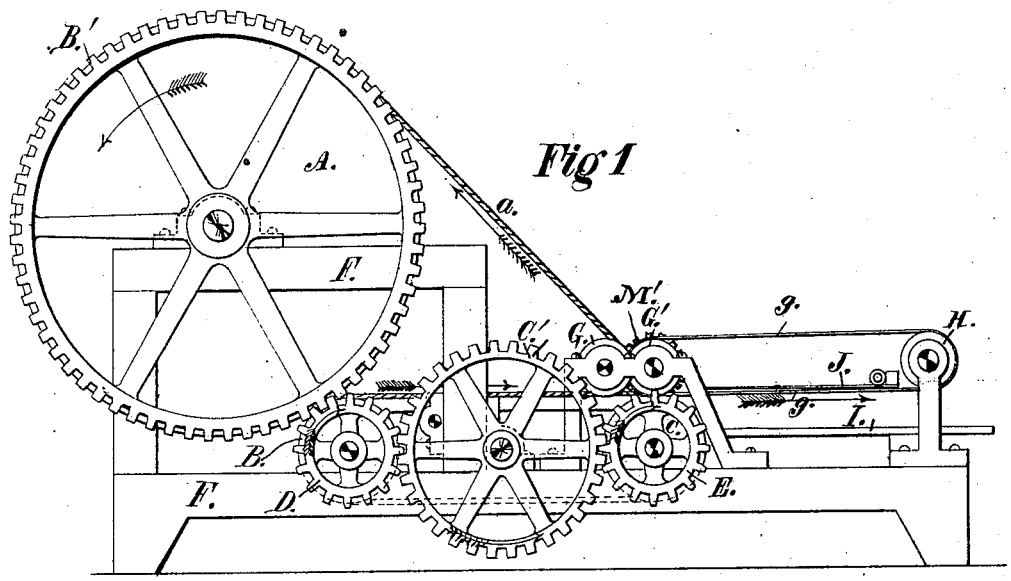
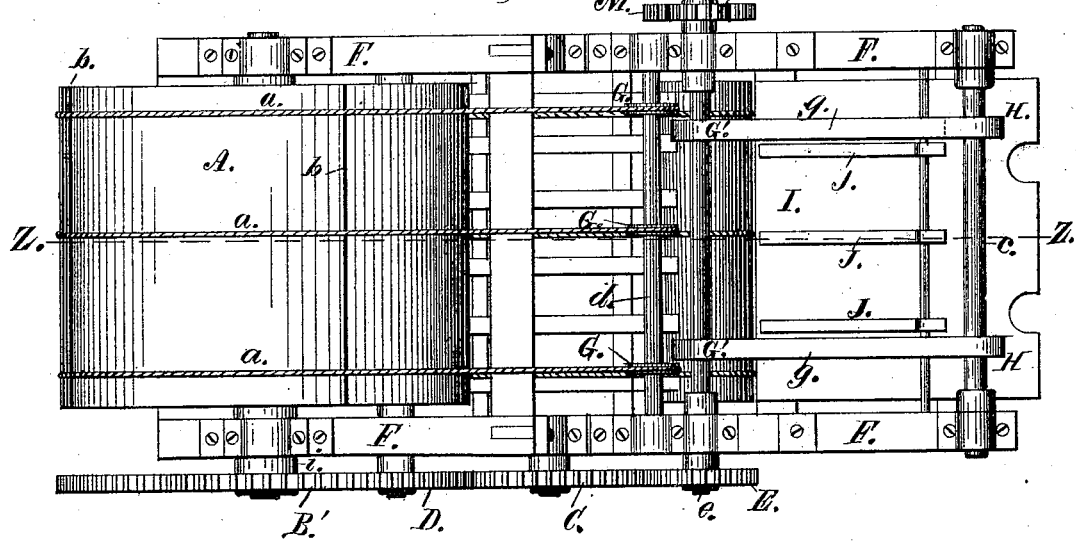
Witnesses:
Stanley Williams
A. M. Dallade Jr.
Inventor
John W. Kellberg
By A. Wilson Atty
N. PETERS, PHOTO-LITHOGRAPHER, WASHINGTON, D.C.

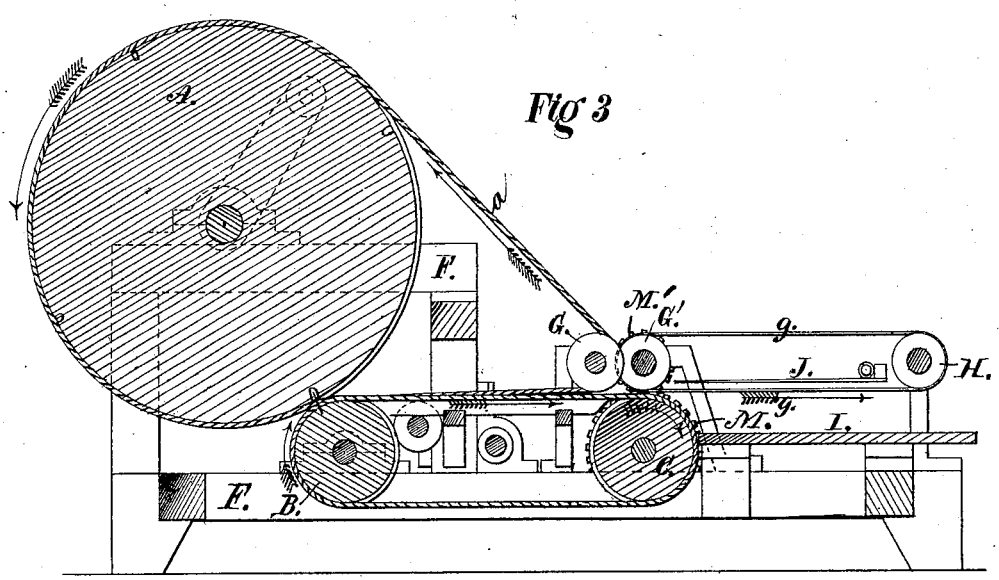

UNITED STATES PATENT OFFICE.

JOHN W. KELLBERG, OF PHILADELPHIA, PENNSYLVANIA.

IMPROVEMENT IN DELIVERING APPARATUS FOR PRINTING-PRESSES.

Specification forming part of Letters Patent No. 167,841, dated September 21, 1875; application filed November 3, 1873.

CASE B.

*To all whom it may concern:*

Be it known that I, JOHN W. KELLBERG, of Philadelphia, county of Philadelphia and State of Pennsylvania, have invented certain Improvements in Devices for Delivering Paper from Printing-Presses, of which the following is a specification:

My invention relates, in the first place, to so constructing and mounting a second impression-cylinder in a rotary perfecting printing-press that it shall act as a female cutting-cylinder, in combination with a male cutting-cylinder, to sever a sheet of paper from a continuous web or roll, and shall, in combination with a series of pulleys mounted on their spindle on the main frame, bear a series of endless traveling-tapes to guide and conduct the severed sheet upon its upper surface a part of the way to its place of delivery in the rear of the machine; and, further, to mounting another cylinder in the same plane, and of the same diameter, with the male cutting-cylinder, and providing them with a series of endless tapes to travel over them, to conduct the severed sheet, upon its under side, in the same direction with the series of tapes first above mentioned; and, finally, to imparting proper motion to the whole by means of a system of gear-wheels. My invention relates, in the second place, to mounting two parallel spindles still farther to the rear on the main frame, and providing them with a series of fast pulleys and a series of endless tapes to travel over them, for the purpose of receiving the severed sheet from the two series of tapes hereinbefore mentioned, and conducting it upon its upper side to the rear, where, by an automatic apparatus, it will be struck down upon the fly-board; and, further, to certain devices by means of which the motion before mentioned is imparted to this fly apparatus in such a manner that the sheet shall be driven to the rear with much greater speed than that imparted to it by the combination of devices first before described. The object of such acceleration of speed is to separate the sheet from the one that follows, by an interval of space and time, in order that an automatic knocker may have time and space to strike it down upon the fly-board and rise again before the arrival of the succeeding sheet, all of which will be further specified with especial reference to the accompanying drawings, in which—

Figure 1 represents a side elevation of a portion of a printing-press embodying my said improvements; Fig. 2, a plan or top view of the same; and Fig. 3, a longitudinal vertical section thereof, made as indicated by the line $z\ z$ in Fig. 2.

F is the main frame; A, the second impression-cylinder, having the longitudinal slots $b$ for the accommodation of the cutting-instrument; B, the male cutting-cylinder, provided with a suitable knife; $d$, a spindle, and G the fast pulleys thereon, and $a$ the endless traveling-tapes upon it and cylinder A to conduct the severed sheet upon its upper side. C is a fly-cylinder, of the same diameter and mounted in the frame in the same plane with cylinder B, and the two are provided with their endless tapes to conduct the sheet on the under side, in co-operation with the tapes $a$ on the upper side. B' is a gear-wheel on cylinder A, and turns D, which is a gear-wheel on cylinder B, and transmits the motion received from B' to gear E on cylinder C, and turns it in the same direction by means of the idle gear C', which is mounted upon a shaft of its own upon the main frame. $e$ and $c$ are two parallel spindles mounted in the rear of spindle $d$ and provided with their respective series of pulleys G' and H, over which travel the endless tapes $g$. These two spindles and their pulleys and tapes are set in motion by means of gear-wheel M, which is mounted on cylinder C at the opposite end from gear E, and is as large or larger than gear E, and the pinion M', which is mounted on spindle $e$ and meshes with gear M, and has a diameter of one-half less than that of gear M, and consequently it will be caused to make two revolutions while gear M makes but one; but each of the pulleys G' has a diameter more than half as great as that of cylinder C, and therefore will have a greater surface-speed than that cylinder, and such excess of speed may be increased or diminished, as desired, by increasing or diminishing the diameters of pulleys G'. The fingers J and their shaft constitute a knocking apparatus, and a vibratory movement to correspond with the action of the tapes may be imparted to it by a cam or otherwise, so that it will strike down just as the rear of the sheet clears cylinder C, and quickly rise again out of the way of the succeeding sheet.

The end of the web, being fed to the second impression-cylinder from above, will be carried down under the same and under tapes $a$, and over cylinder B and over its tapes; and after the sheet is severed it is carried rearward between the two series of tapes, to where the tapes $g$ will conduct it upon the upper side farther rearward until it clears cylinder C, and then the automatic knocker strikes it down upon the fly-board I.

What I claim as my invention, and desire to secure by Letters Patent, is—

1. The combination of the second impression-cylinder A, spindle $d$, having pulleys G, the endless tapes $a$, the male cutting-cylinder B, fly-cylinder C, and their series of endless tapes traveling over them, the whole set in motion by means of the gears B', D, E, and C', and adapted to sever the sheet from the web and conduct it rearward between the said two series of tapes, substantially as shown and described.

2. The combination of cylinder C, gears E and M, of varying diameters, mounted thereon, the pinion M' mounted on spindle $e$, spindle $c$, the pulleys G' and H on their respective spindles, and the endless bands $g$ adapted to conduct the severed sheet back to its place of delivery with an increased rate of speed over that imparted to it by the said first two series of tapes, substantially as and for the purpose set forth and described.

JOHN W. KELLBERG.

Witnesses:
 LUKE V. SUTPHIN,
 GEORGE WOOD.